Feb. 25, 1947.  G. J. LEHMANN  2,416,333
PRECISE MEASUREMENT OF TIME INTERVALS
Filed Sept. 3, 1943
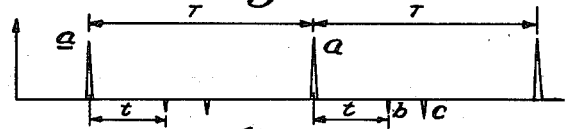
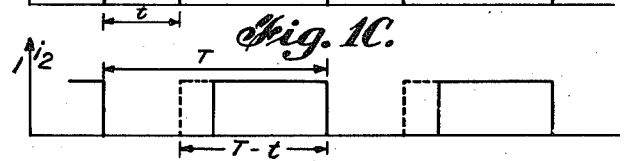
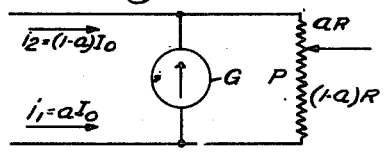
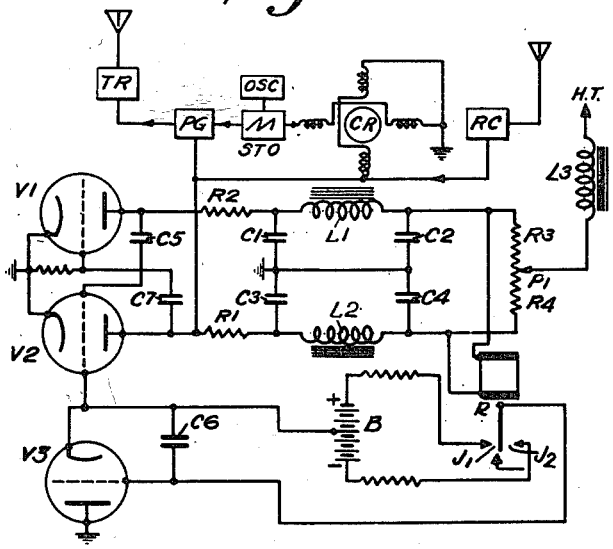
INVENTOR.
GERARD J. LEHMANN
BY
*Edward D. Kenney*
ATTORNEY Patented Feb. 25, 1947

2,416,333

UNITED STATES PATENT OFFICE

2,416,333

PRECISE MEASUREMENT OF TIME INTERVALS

Gerard J. Lehmann, New York, N. Y., assignor to International Standard Electric Corporation, New York, N. Y., a corporation of Delaware Application September 3, 1943, Serial No. 501,071
In Great Britain March 20, 1942

19 Claims. (Cl. 161—15)

The present invention relates to electrical arrangements for the precise measurement of the time interval $t$ elapsing between two short electrical pulses. More particularly, the object of the invention is to provide electrical arrangements for the precise measurement of the time-duration $t$ that elapses between the transmission of a recurrent electrical reference pulse and a pulse that is produced at any moment during the repetition period of the reference pulse, and in particular to measure the time interval $t$ that elapses between the transmission of a pulse and the reception of its echo pulse after reflection from a reflecting surface.

The repetition period $T$ that separates two successive reference pulses is fixed by means of a quartz crystal oscillator and pilot oscillograph, by means of which the period $T$ is determined with great precision. According to the invention, instead of measuring the desired time $t$ directly the ratio of the desired time $t$ to the repetition time $T$ is measured. In one embodiment of the invention this ratio is measured as the ratio of two resistances whose values may conveniently be represented by lengths of resistance wire and the relative values of the resistances are adjusted in order to bring an indication of an auxiliary pulse, adjustable in time, to coincide with an indication of the echo-pulse on the screen of a cathode ray oscillograph. By this means of measurement an absolute precision of $2/1000$ and even more can be obtained. The ratio $$\frac{t}{T}$$

when transformed into a ratio of lengths can be measured with all desired accuracy and without the possibility of being influenced by any variations that may occur in the electrical equipment or in the electrical energy supply.

The invention will be better understood by referring to the following description of one embodiment given by way of example and taken in connection with the accompanying drawings, in which:

Figs. 1a, 1b and 1c are diagrammatic representations of electrical pulses referred to in the description.

Fig. 2 shows schematically a comparison potentiometer.

Fig. 3 shows the circuit arrangements of one embodiment of the invention applied to a system for the determination of distance.

Referring to the drawings the measurement of the ratio $$\frac{t}{T}$$

mentioned hereinbefore is obtained by the measurement of a ratio of resistances by the following arrangements: Pulses of constant direct current of amplitude $I_0$ and duration $t$ and indicated in Fig. 1b are obtained in a circuit as hereinafter described, and pulses of constant direct current of the same amplitude $I_0$ but of duration $(T-t)$ as indicated in Fig. 1c are obtained in a second circuit.

If the ratio $$\frac{t}{T}$$

be designated by $a$, it can be seen that the pulsating current in the first circuit may be considered as the equivalent of a uniform continuous current having a value:

$$i_1 = aI_0$$

Similarly the pulsating current in the second circuit may be considered as the equivalent of a uniform continuous current having a value:

$$i_2 = (1-a)I_0$$

It is possible by means of two low-pass filters to convert the pulsating currents of rectangular wave-form into continuous currents having the respective values $i_1$ and $i_2$.

If these continuous currents are fed through respective portions of a comparison potentiometer P Fig. 2 and if the point P be adjusted so that the voltage drop between the ends of the upper portion $aR$ due to the current $i_2$ flowing through it is equal to the voltage drop between the ends of the lower portion $(1-a)R$ when the current $i_1$ flows therethrough, then there will be no potential difference between the ends of the potentiometer, as would be indicated by a voltage indicating instrument connected thereacross.

It will be seen that, if the potentiometer P consists of a resistance wire of uniform section and of a length L, the distance $l$ from the end of the wire receiving the current $i_2$ to the movable contact slider P will give an exact determination of the time of reception of the echo in the repetition time interval of the reference pulses.

Thus, the measurement of the ratio $$a = \frac{l t}{T}$$

is transformed into the measurement of the relative lengths $$\frac{l}{L}$$

of resistance wire of the potentiometer.

Now it is well known to construct potentiometers that permit measurement of resistances with very great precision. Known types of such potentiometers consist of a calibrated resistance wire wound spirally on a cylinder, and the position of the slider contact on the wire can be determined easily with very great precision.

Figure 3 shows diagrammatically an arrangement embodying the invention in which, by adjustment of the potentiometer sliding contact PI the indication of a pulse controlled as to time can be made to appear on the screen of a cathode ray oscillograph, the position of the said pulse indication with respect to the indication of a reference pulse being controlled by the position of the slider contact of the potentiometer between its two ends.

In this figure a transmitter TR is arranged to transmit pulses of high frequency radiation under the control of a pulse generator PG. The pulse generator PG also delivers pulses to a circuit similar to a double stability or flip-flop circuit comprising a pair of valves VI and V2 connected together in a known manner so that normally the circuit is stable when VI is on and V2 off or vice versa. Thus the grid of the valve VI is connected to the plate of the valve V2 through the condenser C7, while the grid of the valve V2 is connected to the plate of the valve VI through the condenser C5. The valve V2 does not necessarily however come on when the valve VI is shut off because of a time circuit including the condenser C5 which will be later described. The adjustment of this time circuit will determine the time between the turning off of the valve VI and the turning on of the valve V2.

Normally the valve VI is off and the valve V2 is on. A positive pulse delivered from the pulse generator PG of the grid of the valve VI through the condenser C7 turns that valve on which turns the valve V2 off. The valve VI remains on until a reflected signal is delivered to the grid of the valve VI as a negative pulse in a manner to be described. When the valve V2 comes on again at the end of the timed period a negative pulse is produced on the plate of the valve V2 which is fed through a suitable differentiating circuit (not shown) to the vertical deflection plates of the cathode ray oscillograph CR as shown, and gives an indication deflection $c$ shown in Fig. 1a.

The scanning of the oscillograph screen is given the same period as the repetition period of the reference pulses. For example, the oscillator OSC is used to generate in a saw tooth generator STO a saw-tooth oscillation of the same frequency, and the output from the oscillator itself or from the saw tooth generator STO is used for generating the reference pulses in the pulse generator PG. This saw-tooth oscillation produced in the saw tooth generator STO is applied to the horizontal deflection plates of the cathode ray tube CR. The reference pulses produced in the pulse generator PG are applied to the transmitter TR and also to the vertical deflection plates of the cathode ray tube CR and a suitable delay may be introduced if necessary between the pulse generator PG and the cathode ray tube CR to obtain a suitably positioned indication of the positive reference pulse, for example as $a$ in Figure 1a. The received reflected pulse after suitable treatment in a receiver RC (Fig. 3), is applied as a negative pulse to the vertical deflecting plates of CR to give an indication $b$ as shown in Fig. 1a and also via condenser C7 to the grid of valve VI. The measurement is effected by varying the potentiometer resistances R3, R4 until the time controlled pulse indication $c$ is superimposed on the echo pulse indication $b$. At the moment at which this condition is obtained a reading taken on the suitably calibrated potentiometer will give the time $t$ elapsing between the occurrence of the positive pulse and reception of the reflected pulse.

An adjustable resistance-capacity time circuit comprising capacity C5 and the internal resistance of valve V3 as the adjustable element, is connected between the plate of valve VI and grid of valve V2. The elements LI, CI, C2, L2 and C3, C4 constitute filters which transform the intermittent or pulsating currents of rectangular wave-form in the anode circuits of the valves into mean continuous currents which flow in opposite directions through the resistance PI. The energising winding of a relay R, is connected across the ends of the potentiometer resistance and closes contacts JI or J2 depending upon the direction of current flow through the winding. These contacts JI or J2 connect a positive or negative bias from voltage source B to the grid of valve V3 and thereby changing the resistance of this latter and hence the time constant of the circuit of condenser-valve-condenser, C5—V3—C6. L3 is a choke coil which serves to choke any sudden current changes in the high tension supply, thus preventing any variation in the momentary currents that happen to be passing through the valves VI and V2.

The system operates as follows. With relay R as shown, valve V3 is not biased at all. First, a positive trigger on C7 drives valve VI on. The reaction of VI and V2 on each other results in the grid of valve V2 going far below cut-off. Valves VI and V3 provide paths having definite resistances to discharge condenser C5. The resistance through valve VI may be disregarded as negligible. However, the tendency for the grid of V3 to acquire a negative charge due to C6, makes the discharge path through V3 a definite factor in delaying the discharge of C5. Hence, the upward drift of potential of the grid of V2 is controlled. By proper design of the entire system, the grid of valve V2 comes up fast at first and then gradually approaches ground. Thus, an echo pulse of negative polarity on the grid of VI not only cuts off VI but will suffice to move the grid of V2 above cut-off. The well-known multi-vibrator action of one valve on the other comes into play. Under such conditions, echo pulse $b$ will cut VI off and V2 will come on. Pulse $c$ will, therefore, coincide with $b$. It is apparent that the natural period of the flip-flop circuit is such that any echo pulse will trigger it. Such circuits have great flexibility, so a large variation in echo time will still trigger both valves.

Now assume the wiper PI is incorrectly disposed. This means that the IR drop through R3 is different than through R4. In the first case, let relay R close against JI. This places a positive bias on the grid of V3 and greatly reduces the resistance of the discharge path for C5 through valve V3. In fact, the time constant for condenser C5 may be considered as reduced to a negligible value. Hence, when valve VI comes on and valve V2 cuts out, condenser C5 charges almost immediately. Due to the positive bias on the grid of valve V3, the potential of the cathode of V3 can rise to ground and even go above it somewhat. It is clear that V2 changes from cut-off to cut-in almost immediately. Hence, the reverse action occurs and V1 cuts off.

In other words, the flip-flop circuit is now definitely biased to one condition where V1 tends to remain off. Thus, pulse c generated by valve V2 will occur right after trigger pulse a. Echo pulse b will have no effect on the system, since V1 was cut off before the echo arrives. Thus, the cathode ray tube screen will show positive pulse a, negative pulse c following immediately and then negative echo pulse b disposed at a distance from a dependent upon the echo travel time.

Now assume the relay closes against J2. This places a negative bias on the grid of valve V3. When valve V1 cuts in because of a positive trigger pulse, the negative pulse on the grid of V2 cannot discharge through V3 as before. In other words, the recovery period for the system is now greatly extended. Thus, the grid of V2 will be far below cut-off when echo pulse b arrives. Even though this pulse cuts-off valve V1, valve V2 will not necessarily cut-in. This action is similar to triggering a multi-vibrator too early. Thus, while V1 may cut off, the interaction between valves does not occur. Actually, the grid of V2 is not driven above cut-off, so the grid of V1 is not driven below the potential due to pulse b. Thus, the grid of V2 will reach cut-off after echo pulse b. Naturally echo pulse b, cutting out valve V1, will bring up the potential of the grid of V2 so that it will reach cut-off sooner. It is possible to design the system so that pulse c will occur a short time after echo pulse b.

By having relay R sensitive to small potential differences, any slight error at P1 is converted to a large standardized error on the screen. It is clear that the screen will not show how much of an error there is at P1. Hence, irrespective of the magnitude of the error at P1, pulse c will occupy one of the two positions indicated.

The arrangements that have just been described may be used particularly for measuring the interval of time elapsing between the transmission of a pulse and the reception of the echo and hence for determining the distance of an obstacle. In this latter case, the potentiometer may be calibrated for actual distances.

The arrangements hereinbefore described may be easily applied to obtaining direct distance readings and a very high precision is obtained. As a matter of fact, the errors due to the quartz crystal controlled oscillator are negligible owing to the precision of these devices, and the time intervals between the occurrences of the pulses and the operation of the double stability arrangement (V1, V2, Figure 3) can be made very small.

The time interval between the transmission of the reference pulse and the operation of valve V2 comprises both a time interval fixed for any particular object distance and a time interval that depends on the precision with which the coincidence of the echo pulse indication and the time controlled pulse indication is effected on the screen.

The only existing appreciable causes of error lie either in determination of the coincidence or in the precision of the potentiometer. These two factors can be known exactly and this permits the errors to be determined within absolute limits.

No other electrical member comes into play in taking the measurement, and the arrangements described are in particular independent of all members such as self-inductances and capacities, and is also independent of all the feed voltages utilized.

What is claimed is:

1. An electrical system for measuring the time lag between each pulse of a series of primary reference pulses of known constant periodicity and the following pulse of a series of secondary pulses, each of which follows one of the primary pulses by the said time lag, the time lag being less than the period of the primary pulses, comprising means for producing two continuous electric currents whose magnitudes are proportional respectively to the said time lag and to the interval between each secondary pulse and the next following primary pulse, and means calibrated in time units for measuring the relative magnitudes of said currents.

2. An electrical system for measuring the time lag between each pulse of a series of primary reference pulses of known constant periodicity and the following pulse of a series of secondary pulses each of which follows one of the primary pulses by the said time lag, the time lag being less than the period of the primary pulses, comprising means for producing a first series of current pulses of rectangular wave-form of duration equal to the period elapsing between the occurrence of a primary reference pulse and the next occurring secondary pulse, means for producing a second series of current pulses equal in magnitude to the first-mentioned current pulses and of rectangular wave-form of duration equal to the period elapsing between the occurrence of said secondary pulse and the next succeeding primary reference pulse, means for obtaining from said first and second series of current pulses continuous currents of respective corresponding mean valves and means for determining the relative valves of said continuous currents.

3. System according to claim 2 wherein said last-mentioned means comprises a comparison potentiometer having a slider contact and further comprising means for passing said continuous currents in opposite directions through adjacent portions of said potentiometer to said slider contact and an indicating device for indicating when the position of said slider contact is such that the voltage difference between the ends of said potentiometer is zero.

4. Electrical system according to claim 2 wherein said means for producing the current pulses of rectangular wave-form comprises a double stability circuit and further comprising means for applying said primary reference pulses to said double stability circuit to trip it to one condition of stability and means for applying said secondary pulses to said double stability circuit to trip it to the other condition of stability.

5. Electrical system according to claim 2 in which said means for obtaining continuous currents from said first and second series of current pulses comprises a pair of low pass filters.

6. An electrical system for measuring the time lag between each pulse of a series of primary reference pulses of known constant periodicity and the following pulse of a series of secondary pulses each of which follows one of the primary pulses by the said time lag, the time lag being less than the period of the primary pulses, comprising first and second valves connected in a double stability circuit, means for applying said primary reference pulses to said double stability circuit to trip it to one condition of stability, means for applying said secondary pulses to said double stability circuit to trip it to the other condition of stability, a potentiometer, connections including filters from the anodes of said valves to the respective ends of said potentiometer, a slider on said potentiometer connected to a source of high tension, a time delay circuit connected between the anode of said first valve and the control grid of said second valve, means for varying the time constant of said time delay circuit under the control of the potential across the ends of said potentiometer, means for deriving a time controlled pulse from the anode circuit of said second valve, and indicating means for indicating the relative times of occurrence of said primary reference pulses, said secondary pulses and said time controlled pulses.

7. System according to claim 6 wherein said indicating means comprises a cathode ray oscillograph having horizontal and vertical deflecting elements and further comprising means for applying said primary reference pulses, said secondary pulses, and said time controlled pulses to said vertical deflecting elements, a source of saw-tooth waves having a frequency equal to the period of repetition of said primary reference pulses, and means for applying said last-mentioned waves to the said horizontal deflecting elements.

8. System according to claim 6 in which said time delay circuit comprises a condenser in series with the anode-cathode resistance of a thermionic valve and further comprising a relay connected across the ends of said potentiometer and means under the control of said relay for varying the anode-cathode resistance of said valve.

9. The method for measuring the time lag between each pulse of a series of primary reference pulses of known periodicity and the following pulse of a series of secondary pulses each of which follows one of the primary pulses by the said time lag, the said time lag being less than the period of said primary pulses, which comprises the steps of producing a first series of substantially square current waves having the same periodicity as said primary reference pulses and each having a time duration equal to said time lag, producing a second series of substantially square current waves having the same periodicity but having an adjustable time duration, adjusting the time duration of said second waves until said time duration corresponds to the time between the termination of one of said first waves and the beginning of the next succeeding first wave, and determining said time lag directly from the adjustment of said second pulse.

10. The method as disclosed in claim 9, which includes the steps of producing a first substantially steady current proportional to the time duration of said first current waves, producing a second substantially steady current proportional to the time duration of said second current waves, and utilizing the ratio of said steady currents to obtain the measure of said time lag.

11. The method as disclosed in claim 9, which includes the additional step of indicating when the second wave has been adjusted in time duration to equal the time between the termination of a first wave and the beginning of a succeeding first wave.

12. An electrical system for measuring the time lag between each pulse of a series of primary reference pulses of known constant periodicity and the following pulse of a series of secondary pulses, each of which follows one of the primary pulses by the said time lag, said time lag being less than the period of the primary pulses, comprising means for producing a first series of substantially square current waves having a periodicity equal to that of said primary pulses and each having a time duration equal to said time lag, means for producing a second series of substantially square current waves, having the same periodicity, means to terminate each of said second waves by the initiation of the next succeeding one of said first waves, means to adjust the time of initiation of each of said second waves to coincide with the termination of the next preceding first wave, and means to utilize the degree of adjustment as a measure of said time lag.

13. An electrical system as disclosed in claim 12, in which means is provided for indicating when the initiating edge of a second wave is adjusted to coincide with the termination of the next preceding first wave.

14. An electrical system as disclosed in claim 12, in which there is provided means to produce a first current proportional to the time duration of said first waves, means to produce a second current proportional to the time duration of said second waves, and the means to adjust the initiation of said second wave comprises means to adjust the relative value of said currents.

15. An electrical system for measuring the time lag between each pulse of a series of primary reference pulses of known constant periodicity and the following pulse of a series of secondary pulses, each of which follows one of the primary pulses by the said time lag, the said time lag being less than the period of said primary pulses, comprising a first valve, a potentiometer having one end of the resistance thereof connected to the plate of said valve and having the movable contact thereof connected to a source of potential, means to cause each of said primary pulses to turn on said first valve, means to cause each of said secondary pulses to turn off said first valve, a second valve, the plate of said second valve being connected to the other end of the resistance of said potentiometer, means to cause said second valve to turn off when said first valve is turned on, means determined by the setting of said potentiometer to cause said second valve to be turned on after the turning on of said first valve, and means to indicate when said second valve is being turned on simultaneously with the shutting off of said first valve, said potentiometer being calibrated so that said time lag may be read directly by the position of the movable arm thereof.

16. An electrical system as disclosed in claim 15, in which the means to control the turning on of said second valve comprises a time constant circuit including a resistance and a condenser associated with the grid circuit of said second valve, said condenser being adapted to be charged during the time said first valve is turned off to a value depending on the setting of said potentiometer and the time said first valve is turned off, and means to vary the resistance by the potential difference between the ends of said potentiometer.

17. In a system for detecting objects wherein periodic high frequency pulses are emitted and echo pulses returned, the emitted and echo travel time being less than the time between successive emitted pulses, the combination of a biased multi-vibrator normally in one condition but having another temporary condition, means for triggering said multi-vibrator through one complete operating cycle upon the occurrence of an emitted pulse, said multi-vibrator normally tending to remain in its other condition for a time of the same order as the travel time of the emitted and echo pulse, means for triggering said multi-vibrator from its other condition back to its biased condition upon the occurrence of an echo pulse and variable means for indicating the ratio of average currents drawn by said multi-vibrator in said two conditions whereby the travel time of an emitted pulse and its echo pulse may be determined.

18. The system of claim 17 wherein means are provided for changing the dwell period of said multi-vibrator in its other condition to a time substantially different than the travel time of emitted pulse and echo pulse upon the incorrect adjustment of said variable means and wherein means are provided for indicating the lack of coincidence of said echo pulse and return of the multi-vibrator to its one condition.

19. The system of claim 17 wherein means are provided for reducing the dwell of the multi-vibrator in its other condition to a low value so that said second trigger means is ineffective upon the incorrect adjustment of said variable means in one sense and wherein means are provided for increasing the dwell to a high value so that said second trigger means is ineffective upon the incorrect adjustment in reverse sense, and wherein means are provided for indicating the sense of lack of coincidence of said echo pulse and return of the multi-vibrator to its one condition.

GERARD J. LEHMANN.

REFERENCES CITED

The following references are of record in the file of this patent:

UNITED STATES PATENTS

| Number | Name | Date |
| --- | --- | --- |
| 2,086,918 | Luck | July 13, 1937 |
| 2,183,399 | Heising | Dec. 12, 1939 |
| 2,093,512 | Bowen | Sept. 21, 1937 |